United States Patent
Akahori

(10) Patent No.: US 9,313,071 B2
(45) Date of Patent: Apr. 12, 2016

(54) OFDM MODULATION SIGNAL DEMODULATOR, RECEIVING APPARATUS, AND RECEIVING AND DISPLAYING APPARATUS

(71) Applicant: LAPIS Semiconductor Co., Ltd., Yokohama (JP)

(72) Inventor: Hiroji Akahori, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 19 days.

(21) Appl. No.: 13/940,341

(22) Filed: Jul. 12, 2013

(65) Prior Publication Data

US 2014/0023166 A1    Jan. 23, 2014

(30) Foreign Application Priority Data

Jul. 23, 2012 (JP) ................. 2012-162884

(51) Int. Cl.
*H04L 27/26* (2006.01)
*H04B 3/23* (2006.01)

(52) U.S. Cl.
CPC ........ *H04L 27/2649* (2013.01); *H04L 27/2662* (2013.01); *H04B 3/23* (2013.01); *H04B 3/234* (2013.01)

(58) Field of Classification Search
CPC ....... H04B 3/23; H04B 3/234; H04L 27/2662
See application file for complete search history.

(56) References Cited

U.S. PATENT DOCUMENTS

| | | | | |
|---|---|---|---|---|
| 5,101,270 | A * | 3/1992 | Boone et al. | 348/61 |
| 7,353,436 | B2 * | 4/2008 | Taha et al. | 714/701 |
| 7,778,336 | B1 * | 8/2010 | Toumpakaris et al. | 375/260 |
| 2005/0220212 | A1 * | 10/2005 | Marsili | 375/275 |
| 2006/0140293 | A1 * | 6/2006 | Lai et al. | 375/260 |
| 2009/0304128 | A1 * | 12/2009 | Izumi et al. | 375/343 |

FOREIGN PATENT DOCUMENTS

JP    2003-101491 A    4/2003
JP    2006-067047 A    3/2006

OTHER PUBLICATIONS

Fuchs, "Ultrasound—Sound—Amplitude", http://www.ctgclean.com/tech-blog/2011/09/ultrasonics-sound-amplitude/, Sep. 23, 2011.*

* cited by examiner

*Primary Examiner* — Ross Varndell
(74) *Attorney, Agent, or Firm* — Rabin & Berdo, P.C.

(57) ABSTRACT

An OFDM modulation signal receiving apparatus by which a user can generally grasp a reception state of an OFDM modulation signal and take measures to improve the reception quality thereof. The OFDM modulation signal receiving apparatus comprises: an autocorrelation calculating part that calculates an autocorrelation value of an OFDM modulation signal at predetermined periods; an intra-interval total sum value calculating part that sums up comparison result values obtained by comparing the autocorrelation value with at least one threshold in each predetermined interval to calculate an intra-interval total sum value of each predetermined interval; and a selection storage part that stores a piece of autocorrelation level data according to the intra-interval total sum value in each predetermined interval.

19 Claims, 5 Drawing Sheets

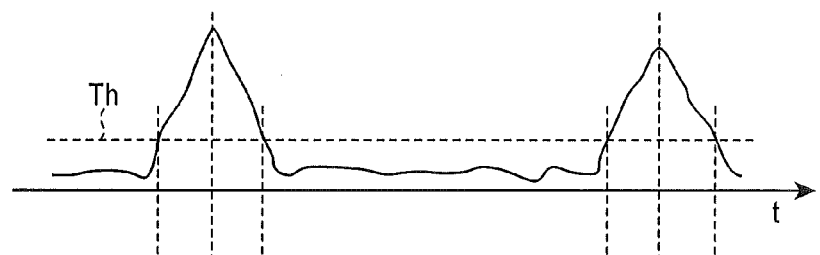
FIG. 4A
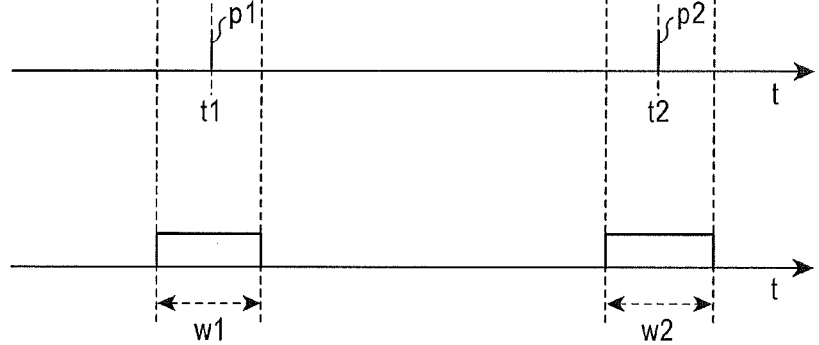
FIG. 4B
FIG. 4C
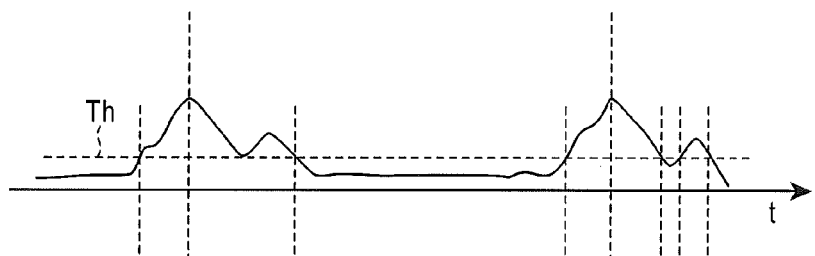
FIG. 5A
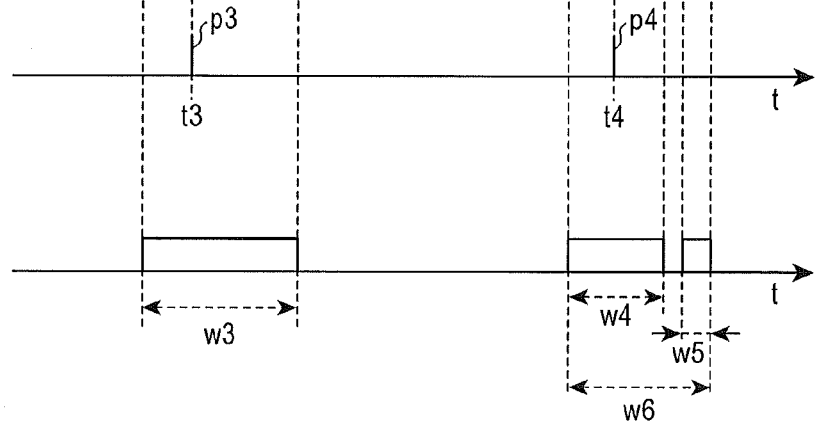
FIG. 5B
FIG. 5C

OFDM MODULATION SIGNAL DEMODULATOR, RECEIVING APPARATUS, AND RECEIVING AND DISPLAYING APPARATUS

CROSS-REFERENCE TO RELATED APPLICATION

This application claims the benefit of foreign priority of Japanese patent application number 2012-162884, filed on Jul. 23, 2012.

BACKGROUND OF THE INVENTION

1. Field of the Invention

The present invention relates to an orthogonal frequency-division multiplexing (OFDM) demodulator for demodulating a signal modulated by OFDM, a receiving apparatus including the same, and a receiving and displaying apparatus further having a display function based on a decoded signal.

2. Description of the Related Art

OFDM has been employed as a digital modulation method for data transmission such as digital terrestrial broadcasting. In OFDM communications, like conventional analog communications, a direction adjustment operation can be performed to direct an antenna of a receiving apparatus toward a sending station for better reception. For example, Japanese Patent Application Laid-Open No. 2003-101491 discloses a technique for displaying the field intensity of a reception signal by dot blocks on a screen to facilitate the direction adjustment operation of the antenna. Japanese Patent Application Laid-Open No. 2006-67047 also discloses a technique for displaying an input field intensity on the reception side.

SUMMARY OF THE INVENTION

When a sending station transmits data to a wide range of area like digital terrestrial broadcasting, reception failures resulting from so-called multipath can occur due to structures and the like lying on propagation paths of the signal. OFDM implements guard intervals between data symbols and is thus said to be less prone to a drop in quality due to multipath. The quality can drop, however, if multipath having a delay amount greater than guard intervals occurs.

The techniques disclosed in Japanese Patent Application Laid-Open Nos. 2003-101491 and 2006-67047 can display the field intensity state of the reception signal. However, such techniques are not able to determine whether a correct demodulation signal cannot be obtained simply because of a low signal intensity of the reception signal or because of the occurrence of multipath. It is therefore not possible to determine which remedial measures to take, whether to add an amplifier to increase the input level of the reception signal or adjust the direction of the antenna to reduce multipath effects.

The present invention has been achieved in view of the foregoing problems. An object of the present invention is to provide an OFDM modulation signal demodulator, receiving apparatus, and receiving and displaying apparatus by which the user can generally grasp a reception state of an OFDM modulation signal and take measures for improving reception quality.

An OFDM modulation signal demodulator according to the present invention is an OFDM modulation signal demodulator for demodulating an OFDM modulation signal, comprising: an autocorrelation calculating part that calculates an autocorrelation value of the OFDM modulation signal at predetermined periods; an intra-interval total sum value calculating part that sums up comparison result values obtained by comparing the autocorrelation value with at least one threshold in each predetermined interval to calculate an intra-interval total sum value of each predetermined interval; and a selection storage part that stores a piece of autocorrelation level data according to the intra-interval total sum value in each predetermined interval.

An OFDM modulation signal receiving apparatus according to the present invention is an OFDM modulation signal receiving apparatus for receiving and demodulating an OFDM modulation signal, comprising: an autocorrelation calculating part that calculates an autocorrelation value of the OFDM modulation signal at predetermined periods; an intra-interval total sum value calculating part that sums up comparison result values obtained by comparing the autocorrelation value with at least one threshold in each predetermined interval to calculate an intra-interval total sum value of each predetermined interval; and an output part that selects a piece of autocorrelation level data from a plurality of pieces of autocorrelation level data according to the intra-interval total sum value and outputs the selected piece of autocorrelation level data in each predetermined interval.

An OFDM modulation signal receiving and displaying apparatus according to the present invention is an OFDM modulation signal receiving and displaying apparatus for providing a display based on a decoded signal obtained by receiving, demodulating, and decoding an OFDM modulation signal, the OFDM modulation signal receiving and displaying apparatus comprising: an autocorrelation calculating part that calculates an autocorrelation value of the OFDM modulation signal at predetermined periods; an intra-interval total sum value calculating part that sums up comparison result values obtained by comparing the autocorrelation value with at least one threshold in each predetermined interval to calculate an intra-interval total sum value of each predetermined interval; and a selection notification part that makes an autocorrelation level notification in each predetermined interval on the basis of an autocorrelation level selected according to the intra-interval total sum value.

The OFDM modulation signal demodulator, receiving apparatus, and receiving and displaying apparatus according to the present invention facilitate a user to generally grasp a state of occurrence of multipath and a noise level and take measures for improving reception quality.

In particular, if the OFDM modulation signal demodulator according to the present invention is mounted on a mobile unit, it is possible to generally grasp the reception state which varies with actual movement, and take measures such as adjusting a relative position between the OFDM modulation signal demodulator and other electrical equipment arranged in the mobile unit.

BRIEF DESCRIPTION OF THE DRAWINGS

FIGS. 4A to 4C are time charts in a single-path situation, FIG. 4A showing an autocorrelation waveform, FIG. 4B showing symbol pulses, FIG. 4C showing areas where an autocorrelation intensity exceeds a threshold;

FIGS. 5A to 5C are time charts in a multipath situation, FIG. 5A showing an autocorrelation waveform, FIG. 5B showing symbol pulses, FIG. 5C showing areas where the autocorrelation intensity exceeds the threshold;

DETAILED DESCRIPTION OF THE INVENTION

Hereinafter, an embodiment according to the present invention will be described in detail with reference to the accompanying drawings.

Figure 1:
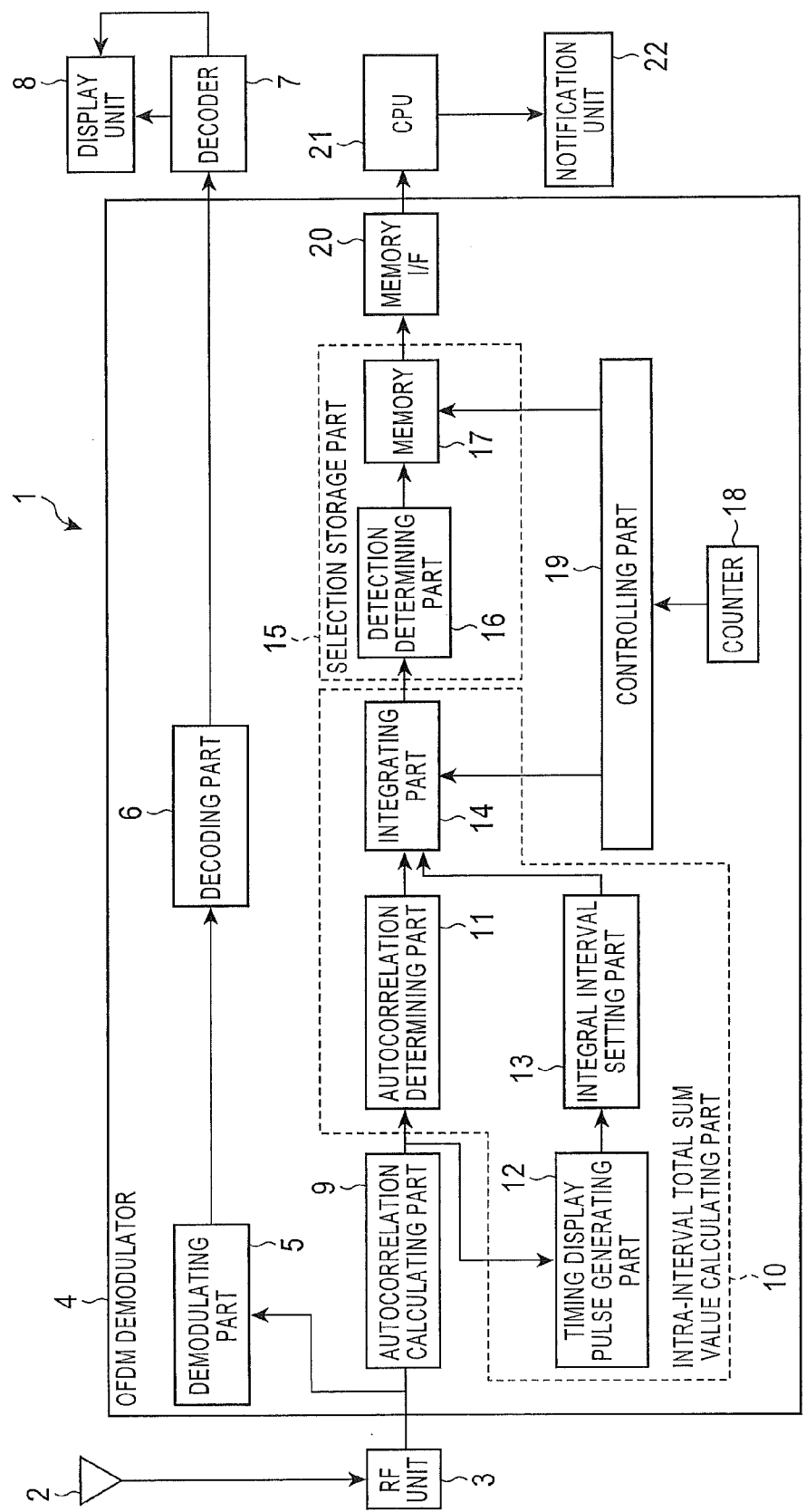
FIG. 1 is a block diagram showing the configuration of an OFDM modulation signal receiving apparatus which is an embodiment of the present invention.

FIG. 1 shows the configuration of an OFDM modulation signal receiving and displaying apparatus 1 (hereinafter, referred to simply as receiving apparatus 1) which is an embodiment of the present invention. The receiving apparatus 1 includes an antenna 2 and can acquire an OFDM modulation signal. Examples of the receiving apparatus 1 include a car navigation apparatus. Examples of the OFDM modulation signal include a digital terrestrial broadcasting signal. In such a case, a display unit 8 to be described later can selectively display map information provided by a car navigation function and a video image of a digital terrestrial broadcast program.

An RF unit 3 applies predetermined signal processing to various reception signals acquired by the antenna 2 as input signals, and supplies the resultant to an OFDM demodulator 4. More specifically, the RF unit 3 initially amplifies the reception signals, which are weak signals, and converts the amplified reception signals into intermediate frequency signals. The RF unit 3 selects a channel signal from the intermediate frequency signals, amplifies the channel signal further, and supplies the resultant to the OFDM demodulator 4.

The OFDM demodulator 4 demodulates and decodes the OFDM modulation signal supplied from the RF unit 3, and supplies the resulting digital signal to a decoder 7 in the subsequent stage. The OFDM demodulator 4 can be configured as a single LSI, i.e., semiconductor device.

A demodulating part 5 demodulates the OFDM modulation signal supplied from the RF unit 3 to obtain a demodulation signal of each sub carrier. The demodulating part 5 performs the demodulation processing by sequentially applying processing including typical serial-parallel conversion, a discrete Fourier transform, equalization, and parallel-serial conversion to the OFDM modulation signal.

A decoding part 6 decodes the demodulation signal and supplies the resulting digital signal to the decoder 7 in the subsequent stage. For example, the decoding part 6 performs the decoding processing by sequentially applying processing for error correction decoding (such as deinterleaving processing and Viterbi decoding processing), energy inverse diffusion processing, RS decoding processing, and signal format conversion processing to the demodulation signal.

The decoder 7 reproduces a video image on the basis of the digital signal supplied from the decoding part 6.

The display unit 8 displays the video image reproduced by the decoder 7. Examples of the display unit 8 include a liquid crystal display.

An autocorrelation calculating part 9 calculates an autocorrelation value of the OFDM modulation signal supplied from the RF unit 3 at predetermined periods. The calculation intervals are sufficiently shorter than one symbol length. Each effective OFDM symbol included in the OFDM modulation signal is typically accompanied with a guard interval (see FIG. 2A). A transmission-side apparatus (not shown) of the OFDM modulation signal duplicates a rear signal of an effective OFDM symbol and attaches the duplicated signal to the top of the effective OFDM symbol as a guard interval. The autocorrelation calculating part 9 compares the guard interval of an OFDM symbol with the rear signal of the OFDM symbol to calculate a correlation value therebetween.

An intra-interval total sum value calculating part 10 sums up comparison result values obtained by comparing the autocorrelation value with at least one threshold in each predetermined interval (hereinafter, referred to as integral interval) to calculate an intra-interval total sum value of each integral interval. The intra-interval total sum value is calculated as the total number of autocorrelation values greater than the threshold(s) among the autocorrelation values included in one integral interval. The range and number of integral intervals are set by a controlling part 19 to be described later. The predetermined interval is longer than the calculation period of an autocorrelation value by the autocorrelation calculating part 9. For example, the intra-interval total sum value calculating part 10 may include an autocorrelation determining part 11, a timing display pulse generating part 12, an integral interval setting part 13, and an integrating part 14.

The autocorrelation determining part 11 compares the autocorrelation value supplied from the autocorrelation calculating part 9 with a predetermined threshold to obtain a comparison result value. Specifically, the autocorrelation determining part 11 determines whether each autocorrelation value calculated by the autocorrelation calculating part 9 is greater than the predetermined threshold. The autocorrelation determining part 11 outputs a comparison result value indicating the result of the determination. The comparison result value is expressed by binary data. For example, if the autocorrelation value is determined to be greater than the threshold (hereinafter, referred to as strong correlation determination), the comparison result value is "1." If the autocorrelation value is determined to be smaller than or equal to the threshold (hereinafter, referred to as weak correlation determination), the comparison result value is "0."

In each symbol period, the timing display pulse generating part 12 determines timing at which the autocorrelation value becomes maximum in the symbol period, and generates a timing display pulse indicating the timing. By such an operation, the timing display pulse generating part 12 generates one timing display pulse for each OFDM symbol.

The integral interval setting part 13 sets a plurality of integral intervals consecutive on a time axis. Here, the integral interval setting part 13 can set the plurality of integral intervals with reference to the timing indicated by the timing display pulses. The range and number of integral intervals are set by the controlling part 19 to be described later.

The integrating part 14 sums up the comparison result values generated by the autocorrelation determining part 11 in each integral interval to obtain an intra-interval total sum value. More specifically, the integrating part 14 sums up the number of strong correlation determinations in each integral interval to obtain an intra-interval total sum value. In other words, the integrating part 14 calculates the total number of autocorrelation values greater than the predetermined threshold (i.e., autocorrelation values determined to be strong correlation determinations) among the plurality of autocorrelation values included in an integral interval as an intra-interval total sum value. The range and number of integral intervals are set by the controlling part 19 to be described later. The integrating part 14 supplies the intra-interval total sum value of each integral interval to a detection determining part 16.

A selection storage part 15 selects one of a plurality of pieces of autocorrelation level data according to the intra-interval total sum value in each predetermined interval, and stores the selected autocorrelation level data. For example, the selection storage part 15 may include the detection determining part 16 and a memory 17.

The detection determining part 16 selects one of a plurality of pieces of autocorrelation level data having respective different displays in each integral interval according to the intra-interval total sum value of each integral interval supplied from the integrating part 14. The detection determining part 15 holds the plurality of pieces of autocorrelation level data in advance. The selection will be described in detail later (FIGS. 6A to 6C and FIG. 7).

The memory 17 stores the autocorrelation level data selected in each integral interval. Examples of the memory 17 include a cache memory in an LSI.

A counter 18 generates a count value for dividing all or part of the range of one symbol period into a plurality of integral intervals. A user may input an instruction for setting the range and number of integral intervals into the counter 18 in advance.

The controlling part 19 sets the range and number of integral intervals for the integrating part 14 according to the count value of the counter 18. The controlling part 19 also controls timing of access to the memory 17 and designation of the storage area of the autocorrelation level data.

A memory I/F 20 is an interface between the memory 17 and outside.

A CPU 21 reads the autocorrelation level data of each integral interval stored in the memory 17 through the memory I/F 20 at predetermined intervals such as every other second, and supplies the read autocorrelation level data to a notification unit 22.

The notification unit 22 notifies the user of an autocorrelation level in a predetermined interval, such as a period equivalent to one symbol length, on the basis of the autocorrelation level data supplied from the CPU 21. The notification unit 22 makes the notification, for example, by means of a screen display or sound. The notification unit 22 makes the notification at predetermined intervals such as every other second. The notification unit 22 may be provided as a display or speaker in the receiving apparatus 1. The notification unit 22 may be an apparatus that is arranged outside the receiving apparatus 1 and has a display function, like a personal computer. The notification will be described in detail later (FIGS. 6A to 6C and FIG. 7).

The foregoing functional blocks 16 to 21 will hereinafter be referred to as an output part. The foregoing functional blocks 16 to 22 will be referred to as a selection notification part.

Figure 2A:
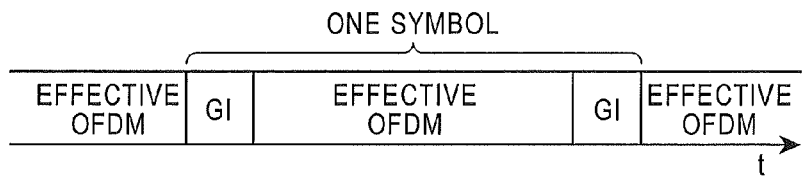
FIGS. 2A to 2C are time charts in a single-path situation, FIG. 2A showing an OFDM modulation signal, FIG. 2B showing an autocorrelation waveform, FIG. 2C showing symbol pulses.
Figure 2B:
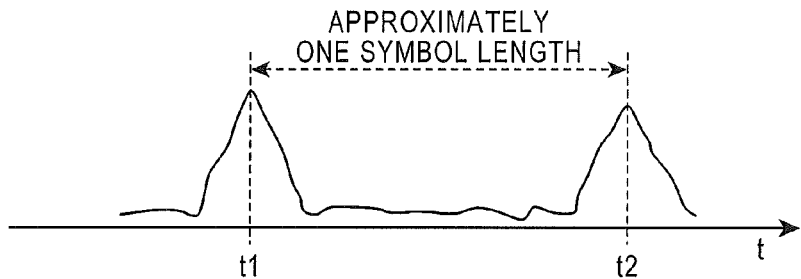
Figure 2C:
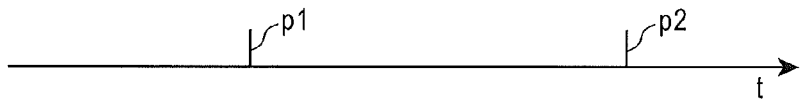

Referring to FIGS. 2A to 2C, a relationship between a reception OFDM modulation signal, an autocorrelation value, and timing display pulses in a single-path situation will be described below. As shown in FIG. 2A, each effective OFDM symbol included in the OFDM modulation signal is accompanied by a guard interval (GI). As shown in FIG. 2B, the autocorrelation value becomes maximum near the border between the effective OFDM symbol and the guard interval.

The peak interval of the autocorrelation value is generally the same as one symbol length. As shown in FIG. 2C, timing display pulses p1 and p2 indicate timing t1 and t2 at which the autocorrelation value becomes maximum in respective symbol periods.

Figure 3A:
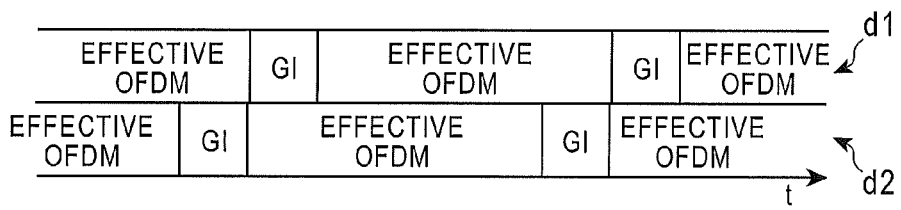
FIGS. 3A to 3C are time charts in a multipath situation, FIG. 3A showing OFDM modulation signals, FIG. 3B showing an autocorrelation waveform, FIG. 3C showing symbol pulses.
Figure 3B:
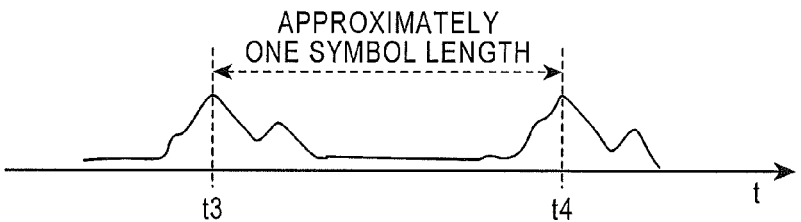
Figure 3C:
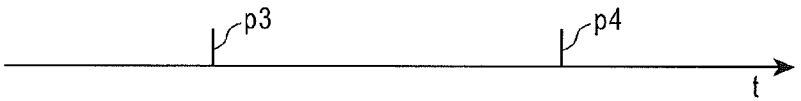

Referring to FIGS. 3A to 3C, a relationship between reception OFDM modulation signals, an autocorrelation value, and timing display pulses in a multipath situation will be described below. As shown in FIG. 3A, the two OFDM modulation signals d1 and d2 differ in reception timing due to multipath. As shown in FIG. 3B, the autocorrelation value here forms a relatively high peak and a relatively low peak in each symbol period. The autocorrelation value becomes maximum near the border between the effective OFDM symbol and the guard interval of one reception OFDM modulation signal d2. The peak interval of the autocorrelation value is generally the same as one symbol length. As shown in FIG. 3C, timing display pulses p3 and p4 indicate timing t3 and t4 at which the autocorrelation value becomes maximum in respective symbol periods.

Referring to FIGS. 4A to 4C, a relationship between the autocorrelation value, the timing display pulses, and intervals where the autocorrelation value exceeds a predetermined threshold (hereinafter, referred to as strong correlation intervals) in the single-path situation will be described below. As shown in FIG. 4A, the autocorrelation value forms a peak in each symbol period. Near the peak, the autocorrelation value becomes greater than a predetermined threshold Th. As shown in FIG. 4B, the timing display pulses p1 and p2 indicate the timing t1 and t2 at which the autocorrelation value becomes maximum in respective symbol periods. As shown in FIG. 4C, there are strong correlation intervals w1 and w2 in respective symbol periods.

Referring to FIG. 5A to 5C, a relationship between the autocorrelation value, the timing display pulses, and strong correlation intervals in the multipath situation will be described below. As shown in FIG. 5A, the autocorrelation value forms a relatively high peak and a relatively low peak in each symbol period. The autocorrelation value becomes greater than the predetermined threshold Th near respective peaks. As shown in FIG. 5B, the timing display pulses p3 and p4 indicate the timing t3 and t4 at which the autocorrelation value becomes maximum in respective symbol periods. As shown in FIG. 5C, one symbol period may include a strong correlation interval w3. Another symbol period may include two successive strong correlation intervals w4 and w5. As shown in FIG. 5A, since the presence of multipath produces two peaks of the autocorrelation value, the strong correlation interval w3 is longer than the strong correlation interval w1 in the single-path situation (FIG. 4C). Similarly, an interval w6 where the strong correlation intervals w4 and w5 exist is longer than the strong correlation interval w2 in the single-path situation (FIG. 4C).

Hereinafter, an autocorrelation determination by the OFDM demodulator 4 and a notification operation based on the result of the determination will be described with reference to FIGS. 6A to 6C and FIG. 7.

The autocorrelation calculating part 9 initially calculates a plurality of autocorrelation values of the OFDM modulation signal supplied from the RF unit 3 at sampling intervals sufficiently shorter than one symbol length over an interval equivalent to one symbol length.

Next, the autocorrelation determining part 11 determines whether each of the autocorrelation values calculated by the autocorrelation calculating part 9 is greater than the predetermined threshold Th. The autocorrelation determining part 11 supplies the result of the strong correlation determination to the integrating part 14 in association with the determination timing.

Figure 6A:
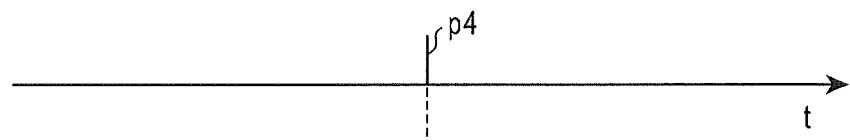
FIG. 6A is a time chart showing a symbol pulse.

Next, the timing display pulse generating part 12 generates a timing display pulse which indicates the timing at which the autocorrelation value becomes maximum in the interval of one symbol length. FIG. 6A shows one timing display pulse p4.

Figure 6B:
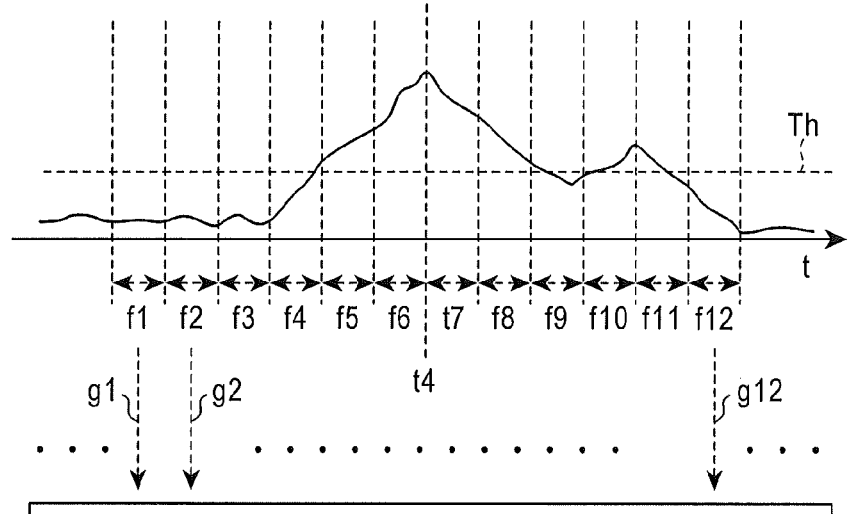
FIG. 6B is a time chart showing an autocorrelation waveform and integral intervals.

As shown in FIG. 6B, the integral interval setting part 13 then sets a plurality of integral intervals f1 to f12 with reference to the timing t4 indicated by the timing display pulse p4.

Next, the integrating part 14 calculates the total numbers of autocorrelation values determined to be strong correlation determinations in the respective integral intervals f1, f2, . . . , f12 as intra-interval total sum values g1, g2, . . . , g12. For example, the autocorrelation values in the integral interval f6 are large and those in the integral interval f1 are small. The intra-interval total sum value g1 of the integral interval f1 is thus smaller than the intra-interval total sum value g6 of the integral interval f6.

Next, the detection determining part 16 selects a piece of autocorrelation level data in each integral interval according to the intra-interval total sum values g1 to g12 of the respective integral intervals calculated by the integrating part 14. The detection determining part 16 holds a table that associates intra-interval total sum values with autocorrelation level data in advance. For example, the table associates intra-interval total sum values of 50 and less with autocorrelation level data d1, intra-interval total sum values of 51 to 100 with autocorrelation level data d2, intra-interval total sum values of 101 to 150 with autocorrelation level data d3, and intra-interval total sum values of 150 and greater with autocorrelation level data d4. Suppose that the intra-interval total sum value g1 is 0 and the intra-interval total sum value g6 is 200. In such a case, the detection determining part 16 selects the autocorrelation level data d1 for the integral interval f1 and the autocorrelation level data d4 for the integral interval f6. The autocorrelation level data d1, d2, d3, and d4 can be expressed, for example, by binary data "00," "01," "10," and "11," respectively. The autocorrelation level data of each integral interval is stored into the memory 17. The storage area of the autocorrelation level data is specified by the controlling part 19.

The autocorrelation calculating part 9, the autocorrelation determining part 11, the timing display pulse generating part 12, the integral interval setting part 13, the integrating part 14, and the detection determining part 16 periodically perform the foregoing processing at intervals of one symbol length or at least in every other interval of one symbol length. The memory 17 stores the autocorrelation level data of each integral interval in each period. While the present embodiment deals with the case where the integral intervals are f1 to f12, the present invention is not limited thereto. The integral intervals may be two or more.

The CPU 21 reads the autocorrelation level data of the integral intervals belonging to a single period from the memory 17 periodically at intervals of one second, for example. The CPU 21 reads the autocorrelation level data through the memory I/F 20. The CPU 21 supplies the read autocorrelation level data to the notification unit 22.

Figure 6C:
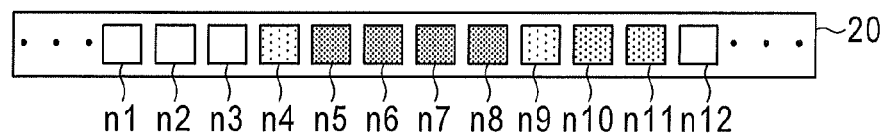
FIG. 6C is a diagram showing an example of a screen display according to autocorrelation levels.

The notification unit 22 notifies the user of the autocorrelation level data supplied from the CPU 21. As shown in FIG. 6C, the notification unit 22 may make the notification by providing autocorrelation level displays n1, n2, . . . , n12 on a screen. The autocorrelation level displays n1, n2, . . . , n12 correspond to the integral intervals f1, f2, . . . , f12, respectively. In other words, the autocorrelation levels of the respective integral intervals are displayed on a screen as juxtaposed on the time axis.

Figure 7:
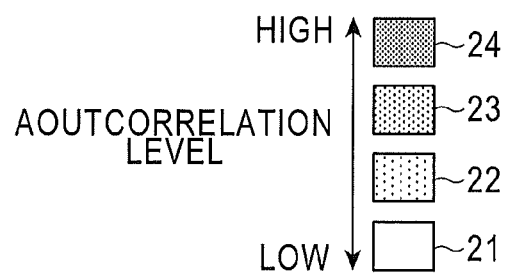
FIG. 7 is a diagram showing an example of correspondence between autocorrelation levels and screen display patterns.

As shown in FIG. 7, the autocorrelation levels are displayed by using different color densities. For example, the notification unit 22 is set in advance so that higher autocorrelation levels are displayed in deeper colors. For example, the intra-interval total sum values g6 and g7 of the integral intervals f6 and f7 are relatively large, so that the autocorrelation level displays n6 and n7 are in deep color. The intra-interval total sum values g1, g2, g3, and g12 of the integral intervals f1, f2, f3, and f12 are relatively small, so that the autocorrelation level displays n1, n2, n3, and n12 are in pale color. The autocorrelation level displays are updated and displayed at each reading period of the autocorrelation level data by the CPU 21.

The user can read the presence or absence of a multipath effect from the screen display. For example, if there is a series of a relatively large number of autocorrelation level displays in deep color (hereinafter, referred to as deep color displays), the user may determine that there are multiple paths occurring. If there are two or more intervals of deep color displays, the user can also determine that there are multiple paths occurring.

As described above, the receiving apparatus 1 of the present embodiment calculates the autocorrelation values of the reception OFDM modulation signal before the demodulation processing, and compares the autocorrelation values with the threshold. The receiving apparatus 1 then calculates the number of autocorrelation values greater than the threshold among the autocorrelation values as an intra-interval total sum value at predetermined time intervals. The receiving apparatus 1 further selects a piece of autocorrelation level data from the plurality of pieces of autocorrelation level data according to the intra-interval total sum value. The receiving apparatus 1 performs such an operation at predetermined periods. The selected autocorrelation level data is successively stored into the memory in the receiving apparatus 1.

The receiving apparatus 1 of the present embodiment thus provides information that allows comprehension of the reception state, not by using the final decoded signals but by using the reception OFDM modulation signal before the demodulation processing. More specifically, the receiving apparatus 1 calculates the autocorrelation values of the reception OFDM modulation signal and provides the information that allows the comprehension of the occurrence of multipath on the basis of the calculations. Consequently, even if the reception quality of the reception OFDM modulation signal is below a demodulation-capable level, it is possible to grasp whether the OFDM modulation signal itself has reached the receiving apparatus 1 and the degree of a multipath effect thereof.

The receiving apparatus 1 stores not the autocorrelation values themselves into the memory 17, but data indicating the intensity of the autocorrelation values along the time axis into the memory 17. More specifically, the receiving apparatus 1 determines the number of strong correlation determinations in each of the given integral intervals, and stores a piece of autocorrelation level data corresponding to the number into the memory 17 in each integral interval. By such an operation, the receiving apparatus 1 can compress a plurality of autocorrelation intensity values included in the single integral interval to produce autocorrelation level information of a single integral interval. In the case of the digital terrestrial broadcasting, 5616 sub carriers are transmitted at periods of approximately 1 ms. If the autocorrelation intensity of each sub carrier was expressed by eight bits of numerical value without information compression, the amount of data needed would be 8×1 k×5616=approximately 45 Mbit/s, which is even greater than the amount of information transmitted by the digital terrestrial broadcasting, approximately 20 Mbit/s. In such a case, for example, the operation of reading the autocorrelation intensity values by the CPU 21 itself could be a source of so-called spurious noise. In contrast, the receiving apparatus 1 of the present embodiment can solve such a problem by the information compression.

The receiving apparatus 1 can provide the user with reception state information from which a cause of reception failures can be identified to improve the communication quality, on the basis of the data stored in the memory 17. For example, the receiving apparatus 1 can present different autocorrelation levels in one symbol period to the user by a method such as screen display. Here, the receiving apparatus 1 can display the autocorrelation levels in respective integral intervals as juxtaposed along the time axis on a screen, so that the user or developer of the receiving apparatus 1 can easily visually grasp the presence or absence of multipath. For example, if there is a series of a relatively large number of deep color displays representing high autocorrelation levels, the user or developer can determine that there are multiple paths occurring. If there are two or more intervals of deep color displays, the user or developer can also determine that there are multiple paths occurring.

The receiving apparatus 1 may be a car navigation apparatus. The developer of the receiving apparatus 1 may mount the receiving apparatus 1 on a vehicle and check the state of occurrence of multipath when needed while running on roads. More specifically, the developer can build the OFDM demodulator 4 into the receiving apparatus 1, instead of using the OFDM demodulator 4 by itself, and easily grasp the reception state of the receiving apparatus 1 under actual use conditions. The user or others can take measures to reduce the effect of multipath on the basis of provided general reception information. Examples of possible measures include adjusting the directional characteristics of the antenna 2 and changing the mounting position of the receiving apparatus 1 in the vehicle and the stop position of the vehicle. Such measures can reduce the effect of multipath to finally construct a desired OFDM receiving and demodulating system.

The receiving apparatus 1 sets the temporal positions of the plurality of integral intervals with reference to the timing indicated by the timing display pulses. With such a configuration, the detection determining part 16 can make a determination on at least intervals of high autocorrelation values even if the range of setting of integral intervals by the integral interval setting part 13 is made shorter than one symbol length. This makes it possible to grasp the presence or absence of multipath even if the range of setting of integral intervals is narrowed to reduce the amount of processing.

The foregoing embodiment has dealt with the case where the intra-interval total sum value calculated by the intra-interval total sum value calculating part 10 is the total number of autocorrelation values greater than a predetermined threshold (autocorrelation values determined to be strong correlation determinations) among autocorrelation values included in an integral interval. However, the present invention is not limited thereto. The intra-interval total sum value calculating part 10 may calculate an integrated value of differences between the respective autocorrelation values greater than the predetermined threshold among the autocorrelation values included in an integral interval and the threshold as an intra-interval total sum value. In such a case, the autocorrelation determining part 11 outputs the comparison result values that indicate differences between the autocorrelation values determined to be strong correlation determinations and the threshold. The comparison result values are expressed as difference values indicating the differences themselves. The integrating part 14 integrates the difference values in each integral interval to obtain an intra-integral total sum value. The integrating part 14 supplies the intra-interval total sum value of each integral interval to the detection determining part 16. Such an operation can also provide the same effects as those of the foregoing embodiment.

The foregoing embodiment has dealt with the case where the autocorrelation levels are displayed stepwise by using different color densities. However, the present invention is not limited thereto. For example, the autocorrelation level of each integral interval may be displayed stepwise by using a plurality of types of color, a plurality of display patterns, a plurality of characters, or a combination of these. The foregoing embodiment has dealt with the case where the autocorrelation levels are displayed in four levels. The present invention is not limited thereto. For example, the autocorrelation levels may be displayed in high and low, two levels (for example, displayed by "■" and "☐"). A single display color may be used to display only the autocorrelation levels of integral intervals where the autocorrelation intensity is determined to be strong (strong correlation intervals) by blinking. The foregoing embodiment has dealt with the case where a screen display is used to make a notification to the user or others. However, the present invention is not limited thereto. For example, sound may be used to make a notification. In such a case, the notification unit 22 may be configured to change a sound type or sound level according to the number of consecutive strong correlation intervals on the time axis. For example, the notification unit 22 may be configured to increase the sound level as the number of consecutive strong correlation intervals increases, or change the output sound stepwise according to the number of consecutive strong correlation intervals.

The foregoing embodiment has dealt with the case where the notification unit 22 makes a notification of the autocorrelation intensity by using a screen display or the like. However, the present invention is not limited thereto. The display unit 8 may make the notification by using a screen display. In such a case, the CPU 21 reads the autocorrelation level data from the memory 17, and supplies the display unit 8 with a display signal according to the data. The display signal is a signal for making the display unit 8 display on a screen a display that indicates the autocorrelation levels by using different color densities or the like (for example, display shown in FIG. 6C). Such an operation can also provide the same effects as those of the foregoing embodiment.

Figure 8A:
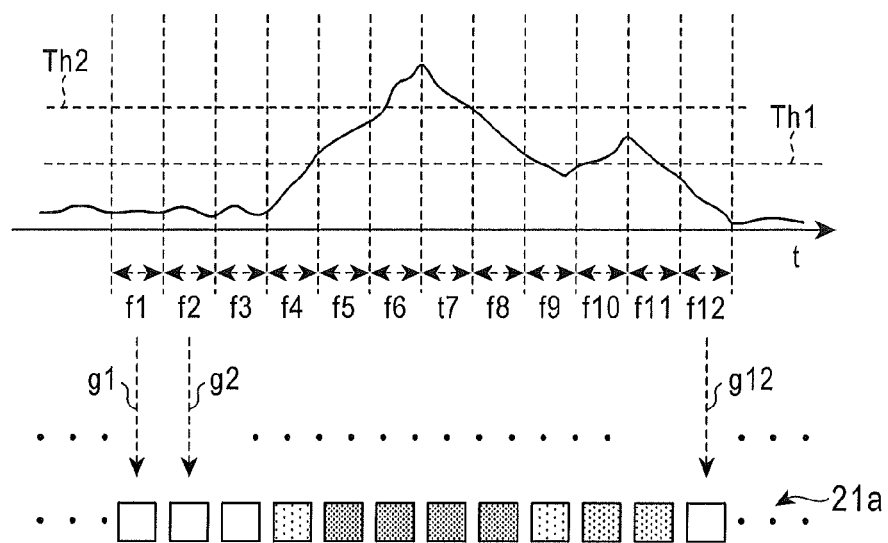
FIGS. 8A and 8B are time charts when two thresholds are used, FIG. 8A showing an autocorrelation waveform and integral intervals, FIG. 8B showing an example of a screen display according to autocorrelation levels.
Figure 8B:
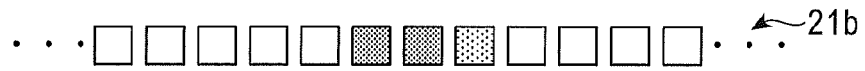

The foregoing embodiment has dealt with the case of using a single threshold. However, the present invention is not limited thereto. For example, as shown in FIGS. 8A and 8B, two thresholds may be used. The autocorrelation determining part 11 determines whether each autocorrelation value calculated by the autocorrelation calculating part 9 is greater than a first threshold Th1, and determines whether the autocorrelation value is greater than a second threshold Th2. The integrating part 14 calculates the number of autocorrelation values greater than the first threshold Th1 among a plurality of autocorrelation values (first intra-interval total sum value g1), and calculates the number of autocorrelation values greater than the second threshold Th2 (second intra-interval total sum value g2). The detection determining part 16 selects pieces of autocorrelation level data according to the first intra-interval total sum values g1 in respective integral intervals (the group of selected pieces of data will be referred to as a first level data group), and selects pieces of autocorrelation level data according to the second intra-interval total sum values g2 in respective integral intervals (the group of selected pieces of data will be referred to as a second level data group). The first and second level data groups are stored into the memory 17. The CPU 21 periodically reads the first and second level data groups, provides first autocorrelation level displays 21a based on the first level data group, and provides second autocorrelation level displays 21b based on the second level data group. With such a configuration, for example, it is possible to grasp the occurrence of multipath from the first autocorrelation level displays 21a, and grasp a maximum peak position of the autocorrelation values from the second autocorrelation level displays 21b. This makes it possible to improve the reception state in a multipath situation more efficiently according to the maximum peak position.

The foregoing embodiment has dealt with the case where the number of autocorrelation values greater than a predetermined threshold among the autocorrelation values of the OFDM signal is calculated as an intra-interval total sum value for each integral interval. However, the following operation may be employed instead. Like the foregoing embodiment, the autocorrelation calculating part 9 calculates the autocorrelation values. In each predetermined interval, the integrating part 14 calculates an integrated value of the autocorrelation values belonging to the predetermined interval as an intra-interval integrated value. The intra-interval integrated value corresponds to total electric power in that integral interval. The detection determining part 16 selects one of a plurality of pieces of autocorrelation level data according to the intra-interval integrated value in each predetermined interval, and stores the selected piece of data into the memory 17. In such a manner, the receiving apparatus 1 simply integrates the autocorrelation values belonging to a predetermined interval without making a determination about the autocorrelation values. According to such a configuration, autocorrelation values smaller than or equal to the threshold are also included into the integrated value. This makes it possible to grasp the reception state in consideration of relatively weak autocorrelation values.

The foregoing embodiment has dealt with the case where the temporal positions of the integral intervals are set with reference to the timing indicated by the timing display pulses. However, the present invention is not limited thereto. The integral interval setting part 13 may set the temporal positions of the integral intervals with reference to arbitrary timing.

This application is based on Japanese Patent Application No. 2012-162884 which is herein incorporated by reference.

What is claimed is:

1. An orthogonal frequency division multiplexing (OFDM) modulation signal demodulator comprising:
a demodulating part that receives an OFDM modulation signal and demodulates the received OFDM modulation signal;
an autocorrelation calculating part that calculates an autocorrelation value of the OFDM modulation signal for each of a plurality of predetermined periods;
an intra-interval total sum value calculating part that successively generates comparison result values, each representing a deviation of the autocorrelation value from a threshold value, and sums up the generated comparison result values at predetermined intervals to obtain an intra-interval total sum value for each of the predetermined intervals; and
a selection storage part that stores a piece of autocorrelation level data according to representing the obtained intra-interval total sum values.

2. The OFDM modulation signal demodulator according to claim 1, wherein the intra-interval total sum value is the total number of autocorrelation values greater than the threshold among the autocorrelation values included in a predetermined interval.

3. The OFDM modulation signal demodulator according to claim 1, wherein the intra-interval total sum value is an integrated value of differences between respective autocorrelation values greater than the threshold among the autocorrelation values included in a predetermined interval and the threshold.

4. The OFDM modulation signal demodulator according to claim 1, wherein the intra-interval total sum value is an integrated value of the autocorrelation values included in a predetermined interval.

5. The OFDM modulation signal demodulator according to claim 1, wherein the predetermined interval is longer than the predetermined period.

6. The OFDM modulation signal demodulator according to claim 1, wherein a position of the predetermined interval on a time axis is set with reference to timing at which the autocorrelation value becomes maximum.

7. The OFDM modulation signal demodulator according to claim 1, wherein:
there are two or more thresholds;
the intra-interval total sum value calculating part calculates the intra-interval total sum value with respect to each of the thresholds; and
the selection storage part selects and stores the autocorrelation level data with respect to each of the thresholds.

8. The OFDM modulation signal demodulator according to claim 1, wherein the selection storage part selects one of a plurality of pieces of autocorrelation level data as the one piece of autocorrelation level data according to the intra-interval total sum value.

9. An orthogonal frequency division multiplexing (OFDM) modulation signal receiving apparatus comprising:
a demodulating part that receives an OFDM modulation signal and demodulates the received OFDM modulation signal;
an autocorrelation calculating part that calculates an autocorrelation value of the OFDM modulation signal for each of a plurality of predetermined periods;
an intra-interval total sum value calculating part that successively generates comparison result values, each representing a deviation of the autocorrelation value from a threshold value, and sums up the generated comparison result values at predetermined intervals to obtain an intra-interval total sum value for each of the predetermined intervals; and
an output part that selects a piece of autocorrelation level data from a plurality of pieces of autocorrelation level data representing the obtained intra-interval total sum values and outputs the selected piece of autocorrelation level data.

10. The OFDM modulation signal receiving apparatus according to claim 9, wherein the intra-interval total sum value is the total number of autocorrelation values greater than the threshold among the autocorrelation values included in a predetermined interval.

11. The OFDM modulation signal receiving apparatus according to claim 9, wherein the intra-interval total sum value is an integrated value of differences between respective autocorrelation values greater than the threshold among the autocorrelation values included in a predetermined interval and the threshold.

12. The OFDM modulation single receiving apparatus according to claim 9, wherein the intra-interval total sum value is an integrated value of the autocorrelation values included in a predetermined interval.

13. The OFDM modulation signal receiving apparatus according to claim 9, wherein the predetermined interval is longer than the predetermined period.

14. The OFDM modulation signal receiving apparatus according to claim 9, wherein a position of the predetermined interval on a time axis is set with reference to timing at which the autocorrelation value becomes maximum.

15. The OFDM modulation signal receiving apparatus according to claim 9, wherein:
   there are two or more thresholds;
   the intra-interval total sum value calculating part calculates the intra-interval total sum value with respect to each of the thresholds; and
   the output part selects and outputs the autocorrelation level data with respect to each of the thresholds.

16. An orthogonal frequency division multiplexing (OFDM) modulation signal receiving and displaying apparatus comprising:
   a demodulating part that receives an OFDM modulation signal and demodulates the received OFDM modulation signal;
   a decoding part that decodes the demodulated OFDM modulation signal;
   a display unit that provides a display based on the decoded signal;
   an autocorrelation calculating part that calculates an autocorrelation value of the OFDM modulation signal for each of a plurality of predetermined periods;
   an intra-interval total sum value calculating part that successively generates comparison result values, each representing a deviation of the autocorrelation value from a threshold value, and sums up the generated comparison result values at predetermined intervals to obtain an intra-interval total sum value for each of the predetermined intervals; and
   a selection notification part that makes an autocorrelation level notification on the basis of an autocorrelation level selected according to the obtained intra-interval total sum values.

17. The OFDM modulation signal receiving and displaying apparatus according to claim 16, wherein the autocorrelation level notification is made by using a screen display or sound.

18. The OFDM modulation signal receiving and displaying apparatus according to claim 17, wherein the screen display includes a plurality of level display images juxtaposed in order along a time axis.

19. The OFDM modulation signal receiving and displaying apparatus according to claim 18, wherein the plurality of level display images include images that are mutually distinguishable by at least one of color density, color type, and display patterns.

* * * * *